(12) United States Patent
Werner et al.

(10) Patent No.: US 10,348,456 B2
(45) Date of Patent: Jul. 9, 2019

(54) PREDICTIVE ACKNOWLEDGMENT FEEDBACK MECHANISM

(71) Applicant: Telefonaktiebolaget LM Ericsson (publ), Stockholm (SE)

(72) Inventors: Karl Werner, Segeltorp (SE); Robert Baldemair, Solna (SE); Håkan Björkegren, Täby (SE); Erik Dahlman, Stockholm (SE); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 202 days.

(21) Appl. No.: 15/038,220

(22) PCT Filed: Feb. 26, 2016

(86) PCT No.: PCT/SE2016/050150
§ 371 (c)(1),
(2) Date: May 20, 2016

(87) PCT Pub. No.: WO2017/095289
PCT Pub. Date: Jun. 8, 2017

(65) Prior Publication Data
US 2018/0041311 A1    Feb. 8, 2018

Related U.S. Application Data

(60) Provisional application No. 62/261,544, filed on Dec. 1, 2015.

(51) Int. Cl.
*H04L 1/18* (2006.01)

(52) U.S. Cl.
CPC .......... *H04L 1/1838* (2013.01); *H04L 1/1848* (2013.01); *H04L 1/1854* (2013.01); *H04L 1/1858* (2013.01); *H04L 1/1877* (2013.01)

(58) Field of Classification Search
CPC ... H04L 1/1838; H04L 1/1848; H04L 1/1854; H04L 1/1858; H04L 1/1877
See application file for complete search history.

(56) References Cited

U.S. PATENT DOCUMENTS

| 7,069,483 B2 | 6/2006 | Gillies et al. |
| 8,953,550 B2 | 2/2015 | Dinan |

(Continued)

FOREIGN PATENT DOCUMENTS

| CN | 104780029 | * | 7/2015 | ............... H04L 1/18 |
| EP | 1873952 A1 | | 1/2008 | |

(Continued)

*Primary Examiner* — Ronald B Abelson
(74) *Attorney, Agent, or Firm* — Murphy, Bilak & Homiller, PLLC

(57) ABSTRACT

A method implemented in a first communication node (110) for communicating with a second communication node (120) over an acknowledged connection (131), comprising: receiving a stream of code blocks from the second communication node, wherein each code block is associated with a check value enabling error detection and belongs to a predefined group of code blocks; detecting errors in received code blocks using respective associated check values; and transmitting to the second communication node an acknowledgement in respect of each of said predefined groups of code blocks, wherein a negative value of the acknowledgment signifies that an error was detected for at least one of the code blocks in the predefined group, wherein the acknowledgement for a predefined group of two or more code blocks is based on a combination of error detection results for a subset of the code blocks in the predefined group.

11 Claims, 5 Drawing Sheets

(56) References Cited

U.S. PATENT DOCUMENTS

| | | |
|---|---|---|
| 2002/0080806 A1* | 6/2002 | Haggard Ljungqvist ............... H04L 1/1809 370/401 |
| 2002/0149496 A1* | 10/2002 | Dabak ................. H03M 13/258 340/11.1 |
| 2005/0066255 A1 | 3/2005 | Jiang |
| 2006/0187870 A1 | 8/2006 | Zhu et al. |
| 2007/0030799 A1 | 2/2007 | Kaburaki et al. |
| 2008/0176591 A1 | 7/2008 | Fujimoto |
| 2008/0259964 A1 | 10/2008 | Tomita |
| 2008/0317146 A1* | 12/2008 | Kwon ..................... H04L 27/28 |
| 2009/0274139 A1* | 11/2009 | Palanki .................... H04J 3/24 |
| 2013/0315235 A1* | 11/2013 | Foo ......................... H04L 67/06 370/389 |

FOREIGN PATENT DOCUMENTS

| | | |
|---|---|---|
| EP | 2104258 A2 | 9/2009 |
| WO | 2007059201 A2 | 5/2007 |

* cited by examiner

PREDICTIVE ACKNOWLEDGMENT FEEDBACK MECHANISM

TECHNICAL FIELD

Disclosed herein are techniques for facilitating digital communication over an error-prone connection between two communication nodes. In particular, there is proposed a predictive acknowledgment feedback mechanism for such a connection.

BACKGROUND

Wireless networks standardized by Third Generation Partnership Long Term Evolution (3GPP LTE) implement ARQ (Automatic Repeat Request) or hybrid-ARQ (HARQ), from which HARQ also includes forward error correction. HARQ is used in HSDPA and HSUPA, which provide high-speed data transmission for mobile phone networks such as UMTS, and in the IEEE 802.16-2005 standard for mobile broadband wireless access, also known as "mobile is WiMAX". It is also used in EVDO and LTE wireless networks.

In systems of this type, terminals are required to send acknowledgment feedback to the network indicative of a result of decoding a transport block or codeword (ACK/NACK or ACK/NAK feedback). The ACK/NACK related to downlink transmissions is transmitted on the uplink. The feedback is used to trigger fast retransmissions. In LTE frequency-division duplex (FDD), as schematically depicted in FIG. 6, a terminal is required to transmit ARQ or hybrid-ARQ acknowledgment related to downlink subframe n in uplink subframe n+4. In FIG. 6, $T_p$ denotes a propagation delay from the access node to the terminal; $T_{TA}$ denotes an offset separating the start of an uplink subframe relative to the start of a corresponding downlink subframe at the terminal; $T_{UE}$ is the processing time available to the terminal; and $T_{eNB}$ is the processing time available to the access node. This allows the terminal between 2 and 3 ms for decoding the transport block and preparing the uplink transmission that carries the ACK/NACK. The exact time depends on timing advance settings.

FIG. 7 illustrates a timing relationship between downlink data and uplink hybrid-ARQ acknowledgement for time-division duplex (TDD). In fact, the acknowledgement transmitted in uplink subframe 7 is bundled, and will be positively valued only if both of the downlink transmissions in subframe 0 and 3 are correctly decoded.

In LTE, as outlined in FIG. 8, a transport block comprises one or more code blocks. Each received code block needs to be correctly decoded, i.e. decoded without detected errors, in order for the transport block to be deemed correctly decoded. A cyclic redundancy check (CRC) value is inserted into each code block. The CRC makes it possible for the terminal to determine whether it has been correctly decoded or not.

It is expected that future radio access ("5G") transport blocks will be structured in a similar way. For some services foreseen for 5G, however, the delay associated with ACK/NACK signaling as currently practiced in LTE will not be acceptable. More precisely, it is expected that the time allowed for the terminal to decode a transport block and transmit ACK/NACK feedback may be significantly reduced compared to LTE, possibly down to tens of microseconds. In some proposed deployments of 5G networks, terminals may be required to send ACK/NACK feedback to the network before any further downlink or uplink signaling can take place. This means that to the frame structure must leave some guard time to allow for decoding of the transport block. In a typical implementation, the time required to decode a code block once all its OFDM symbols have been received corresponds approximately to the duration of one OFDM symbol. Guard times of this order of magnitude would be wasteful of system resources. It is therefore desirable to expedite the terminal's transmission of ACK/NACK feedback.

SUMMARY

In view of the state of the art outlined in the preceding section, the invention proposes devices, methods, computer programs and computer program products, as defined by the independent claims.

On a transmitting side, a first communication node will be considered which is adapted for acknowledged connection to a second communication node and comprises at least a receiver, one or more processors and a transmitter. The connection is a wireless or wired connection over a medium that is known or expected to generate some amount of transmission errors or other errors during normal operation. A purpose of an acknowledgment mechanism is to monitor and correct such errors.

The receiver is configured to receive a stream of code blocks from the second communication node, wherein each code block is associated with a check value enabling error detection and belongs to a predefined group of code blocks. In 3GPP LTE, a code block is the lowest level on which CRC insertion is performed. In this disclosure including the appended claims, "code block" denotes, for any communication system, the smallest unit that the system associates with an independent check value. It is noted that the term "code block" is used in a forward-looking sense, to include also future equivalents, in particular, the smallest unit associated with an independent check value in a 5G wireless communication system, whether or not such unit is referred to specifically as a "code block". As the term "stream" indicates, sequentiality of the code blocks is no essential feature of this invention; indeed, information from two or more code block may be mapped to one modulation symbol in 3GPP LTE, so that arguably their respective transmission times are indistinguishable, and this fact is not expected to change in future radio access technologies.

The one or more processors are configured to detect errors in received code blocks using check values associated with respective code blocks. Furthermore, the one or more processors are configured to combine error detection results for received code blocks. By agreement, the first communication node may be configured to transmit a negatively valued acknowledgment for a predetermined group as soon as an error has been detected for any the code blocks in the predefined group. If the one or more processors produce error detection results e1, e2, e3, e4, e5, to from which a positive value signifies the presence of an error, then the processor(s) may proceed to combine these as e1 OR e2 OR e3 OR e4 OR e5. This expression is positive as soon as one of the error detection results is positive. For simplicity of this disclosure, "combine" will include also the trivial combining of a single error detection result, as may be the case for a predefined group where only one code block needs to be considered. The error detection result for the group will then coincide with the error detection result for the sole code block.

The transmitter is configured to transmit to the second communication node, based on a combination of error detection results, an acknowledgement in respect of each of said predefined groups of code blocks, wherein a negative value of the acknowledgment signifies that an error was detected for at least one of the code blocks in the predefined group.

In an embodiment, an acknowledgement for a predefined group of two or more code blocks is based on a combination of error detection results for a subset of the code blocks in the predefined group. A "subset" may be a proper subset in the sense that at least one code block in the predefined group is excluded from the combination. As noted above, for a group of two code blocks, the first communication node will base the acknowledgement on a single error detection result.

Because a first communication node in accordance with this embodiment need not wait until all code blocks in a predefined group have been processed (in particular, until all code blocks have been detected for errors), it may be able to transmit an acknowledgement in respect of this predefined group in less time than a reference system basing its acknowledgement on error detection results for all code blocks in the predefined group would need. In particular, the transmitter of the first communication node may be configured to initiate the transmission of the acknowledgement before the processor(s) has completed detection of errors in all code blocks of the concerned predefined group of code blocks. As used herein, "initiate transmission" includes preparatory steps, e.g. building a feedback message that is to include the value of the acknowledgment. The act of generating the electromagnetic wave carrying such feedback message may begin at a later point in time, even—in case of significant processing delays—after the receiver receives the last code block. This is nevertheless an improvement over the reference system.

In another aspect, there is provided a method to be executed in a first communication node for communicating with a second communication node over an acknowledged connection. The method includes receiving a stream of code blocks from the second communication node, wherein each code block is associated with a check value enabling error detection and belongs to a predefined group of code blocks; detecting errors in received code blocks using respective associated check values; and transmitting to the second communication node an acknowledgement in respect of each of said predefined groups of code blocks, wherein a negative value of the acknowledgment signifies that an error was detected for at least one of the code blocks in the predefined group.

In one embodiment, the acknowledgement for a predefined group of two or more code blocks is based on a combination of error detection results for a subset of the code blocks in the predefined group.

Turning to the transmitting side, a second communication node adapted for acknowledged connection to a first communication node comprises at least a buffer, a transmitter and a receiver. The buffer is configured to temporarily store code blocks to be transmitted to the first communication node. The transmitter is configured to transmit a stream of the code blocks to the first communication node, wherein the code blocks are grouped into predefined groups. Each predefined group is associated with a check value; the check value may be inserted by the transmitter or may be present since the completion of upstream processing steps. The receiver is configured to receive from the first communication node an acknowledgement in respect of one of the predefined groups of transmitted code blocks. The receiver is furthermore configured to cause the transmitter to retransmit said predefined group of transmitted code blocks in response to a received negatively valued acknowledgment.

In one embodiment, the transmitter is further configured to transmit an indication concerning timing or allowed delay of acknowledgement feedback.

By way of this indication, the second communication node is able to control the first communication node (on the receiving side) the extent to which acknowledgement feedback is time critical. This allows the second communication node to benefit from rapid (predictive) acknowledgement feedback at times when this is warranted and from reliable (non-predictive) acknowledgment feedback at other times.

In another aspect, there is provided a method implemented in a first communication node for communicating with a second communication node over an acknowledged connection, comprising: receiving a stream of code blocks from the second communication node, wherein each code block is associated with a check value enabling error detection and belongs to a predefined group of code blocks; detecting errors in received code blocks using respective associated check values; and transmitting to the second communication node an acknowledgement in respect of each of said predefined groups of code blocks, wherein a negative value of the acknowledgment signifies that an error was detected for at least one of the code blocks in the predefined group.

In one embodiment, the acknowledgement for a predefined group of two or more code blocks is based on a combination of error detection results for a subset of the code blocks in the predefined group.

In other aspects, there are also provided a computer program and a computer-readable medium carrying this computer program.

It is noted the invention relates to all combinations of features, even if recited in mutually different claims.

BRIEF DESCRIPTION OF THE DRAWINGS

Embodiments will now be described in greater detail and with reference to the accompanying drawings, on which.

DETAILED DESCRIPTION OF EMBODIMENTS

Within the context of the present disclosure, the term "communication network" or short "network" may particularly denote a collection of nodes or entities, related transport links, and associated management needed for running a service, for example a telephony service or a packet transport service. Depending on the service, different node types or entities may be utilized to realize the service. A network operator owns the communication network and offers the implemented services to its subscribers. Typical examples of a communication network are radio access network (such as WLAN/Wi-Fi and cellular networks like 2G/GSM, 3G/WCDMA, CDMA, LTE), mobile backhaul network, or core network such as IMS, CS Core, PS Core.

Within the context of the present disclosure, each of the term "user equipment" (UE) and "wireless communication device" refers to a device for instance used by a person for his or her personal communication. It can be a telephone-type of device, for example a telephone or a SIP phone, cellular telephone, a mobile station, cordless phone, or a personal digital assistant type of device like laptop, notebook, notepad equipped with a wireless data connection. The UE may also be associated with non-humans like animals, plants, or even machines, and may then be configured for machine-type communication (MTC), which is also referred to as machine-to-machine (M2M) communication, device-to-device (D2D) communication or sidelink. A UE may be equipped with a SIM (Subscriber Identity Module) comprising unique identities such as IMSI (International Mobile Subscriber Identity) and/or TMSI (Temporary Mobile Subscriber Identity) associated with a subscriber using the UE. The presence of a SIM within a UE customizes the UE uniquely with a subscription of the subscriber.

Within the context of the present disclosure, each of the terms "base station" and "wireless access node" refers to a node of a radio access network that is used as interface between land-based transport links and radio-based transport links, wherein the radio-based transport link interfaces directly with a UE. For example, in a GSM/2G access network a base station refers to a BTS, in a WCDMA/3G access network a base station refers to a NodeB, and in a LTE access network a base station refers to a eNodeB. In WLAN/Wi-Fi architecture, a base station refers to an Access Point (AP).

The invention may be put to use in any node in a network that implements receiver functionality. One typical implementation is in a UE and relates to processing of a downlink transport blocks with ACK/NACK feedback transmitted on uplink. Another implementation may be in multi-hop backhauling between network nodes, where fast feedback is essential.

Figure 1:
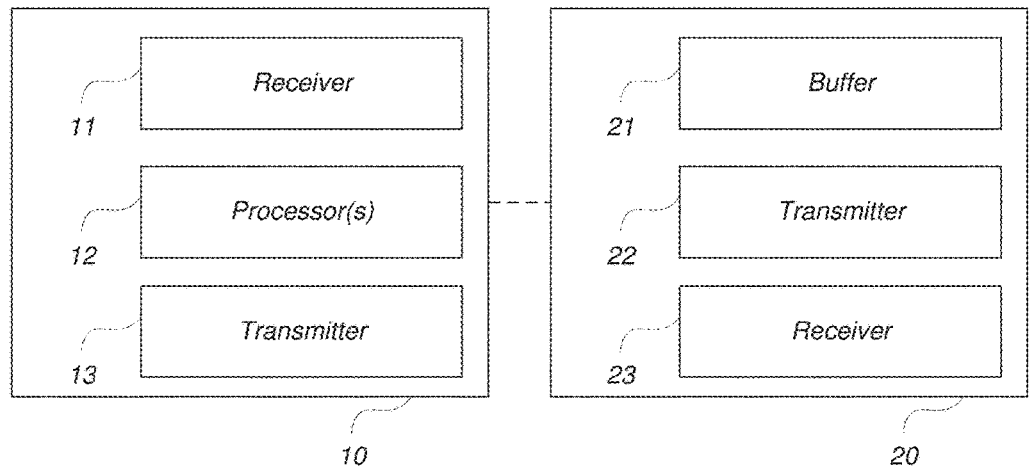
FIG. 1 illustrates a first and a second communication node communicating over a wired or wireless acknowledged connection.

FIG. 1 shows two communication nodes 10, 20 operable to be communicatively connected by a wireless or wired connection, as indicated by the dashed line. The connection is an acknowledged connection in the sense that some errors are monitored and the transmitting side is configured to retransmit a predefined group of code blocks in response to a request by the receiving side. The connection may as well comprise a retransmission protocol, such as a higher-layer retransmission protocol; one example, in LTE, is the Radio Link Control (RLC) protocol, through which may be requested retransmission of RLC protocol data units, which are typically significantly larger than LTE code blocks.

The first communication node 10 comprises a receiver 11 configured to receive a stream of code blocks from the second communication node 20, wherein each code block is associated with a check value enabling error detection and belongs to a predefined group of code blocks. In particular, each code block may belong to exactly one predefined group. While check value insertion may be implemented on larger units than the predefined group of code blocks discussed here, the first communication node 10 is preferably configured to process a stream of code block that is void of check values associated with smaller units than the predefined group of code blocks or at least configured to disregard any check values on that level. The predefined group comprises code blocks encoded by modulation symbols; in some embodiments, the first communication node 10 may be configured to process predefined groups encoded by consecutive modulation symbols, such as orthogonal frequency-division multiplexing (OFDM) symbols. It is noted that there is generally no stable numerical relationship between modulation symbols and code blocks: it may be envisioned that one code block is encoded by one or more modulation symbols, and conversely, one modulation symbol may carry data from one or more code blocks.

The first communication node 10 comprises at least one processor 12, such as a single processor, a multi-core processor, or a group of cooperating processors. The at least one processor 12 is configured to, on the one hand, detect errors in received code blocks using respective associated check values, and, on the other, combine error detection results for one or more received code blocks. The check value may be one of: a parity bit, a hash value, a checksum value, a cyclic redundancy check value. CRC value; for each of these examples, the error detection may include recomputing the check value in a same fashion as was done on the transmitting side (or equivalently, by an algorithm on which the communicating parties have agreed in advance) and assessing whether it is equal to the received check value. The error detection may be an integrated stage of a demodulation process.

The first communication node 10 further comprises a transmitter 13 configured to transmit to the second communication node 20, based on a combination of error detection results, an acknowledgement in respect of each of said predefined groups of code blocks. It is agreed that a negative value of the acknowledgment signifies that an error was detected for at least one of the code blocks in the predefined group. The negative value of the acknowledgement may have the effect of triggering a retransmission. Depending on the implementation, a TRUE error detection result may be used to denote either that the concerned code block was error free (agreement with the received check value) or contained an error (disagreement with the received check value), and similarly, it is a matter of convention whether a TRUE value of a combination of error detection results denotes that all code blocks were decoded satisfactorily or with one or more errors; either way, it will be within the abilities of one skilled in the art to identify a logical operation, such as OR. NOR, AND or NAND with two or more input variables, that provides the desired combined error detection result. As outlined above, the first communication node 10 is configured to base its acknowledgement for a predefined group of two or more code blocks on a combination of error detection results for a subset of the code blocks in the predefined group.

The communicating parties operating the first and second communication nodes 10, 20 have typically agreed, e.g. by adhering to an industry standard such as 3GPP LTE, on a format for transmitting the acknowledgement. In such a standardized format, it may have been supposed or implicitly supposed that the acknowledgment for a predefined group of two or more code blocks be based on a combination of error detection results for all code blocks in the predefined group. In an embodiment, the acknowledgement may be sent in the agreed format even though it is based on a combination of error detection results for a subset of the code blocks in the predefined group. In particular, a negatively valued acknowledgement in respect of a predefined group of code blocks may be transmitted in the form of a request for retransmission of that predefined group of code blocks. Accordingly, this embodiment may be implemented on the receiving side unnoticeably to the transmitting side; this provides for easily achievable compatibility with legacy equipment.

It is noted that, even if the first communication node 10 transmits a positively valued acknowledgment that turns out to be factually incorrect (i.e., the error detection results missing from the combination are such that they would have led to a negative value of the acknowledgement), then the retransmission protocol may ensure that the incorrectly or unsuccessfully decoded data will eventually be available to the first communication node 10.

Figure 9:
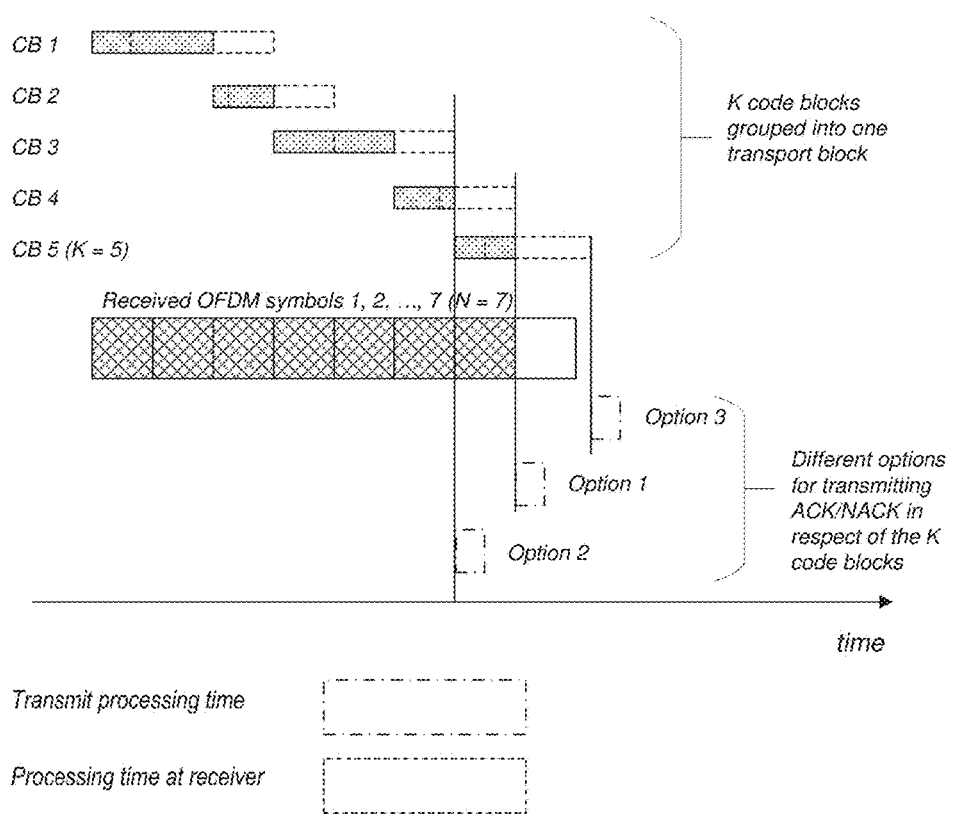
FIG. 9 illustrates three options for timing of acknowledgment feedback in respect of a group of code blocks, according to embodiments disclosed herein, wherein periods of transmit processing time have been indicated by dash-dotted line and periods of processing time at the receiver have been indicated by dashed line.

FIG. 9 shows an example in the context of LTE, wherein a code block may be referred to precisely as "code block" and a predefined group of code blocks may be referred to as a "transport block". In the figure is shown a transport block comprising K=5 code blocks ("CB") encoded by N=7 OFDM consecutive symbols, which are arranged with respect to a horizontal time axis indicating their respective times of receipt. A solid rectangle corresponding to the duration of one OFDM symbol is shown to the right of the last OFDM symbol. No transmission time is associated with a code block as such, but an adjacent dashed rectangle to the right of each code block area illustrates the time interval in which the receiving side processes a code block, including error detection for that code block.

Immediately above the time axis, three possible time periods for preparing and transmitting an acknowledgment in respect of the transport block are indicated. Transmit processing time is understood as the time required from the availability of ACK/NACK feedback information in the UE until the part of the feedback message that depends on the ACK/NACK feedback is ready for transmission. Accordingly, the beginning of each time period refers to initiation of the acknowledgment transmission, which may include one or more of the following: populating a feedback message template with the value of the acknowledgment, retrieving supplementary information to accompany acknowledgment, initiating processing to generate such supplementary information, ensuring compliance with an agreed message format, or the like. This means that the first communication node 10 may perform some actions before the illustrated transmit processing time starts: begin building a feedback message, retrieve supplementary information to accompany acknowledgment, generate supplementary information and the like. It is furthermore understood that the end of each illustrated time period refers to starting the generation of an electromagnetic waveform that carries the acknowledgement. As such, the transmission stricto sensu is contained in a time period (not shown) immediately succeeding the illustrated transmit processing time.

In an embodiment illustrated in FIG. 9 as option 1, transmit processing starts after the last OFDM symbol is received but before the last code block has been decoded (dashed rectangle). The associated ACK/NACK feedback refers to the full transport block, but is based only on code block 1, 2, 3 and 4 (or more generally, on the code blocks in the range [1, K−P] with P=1). In this option, even though all code blocks are eventually decoded, only code blocks that are mapped to the M=6 first OFDM symbols are used for the ACK/NACK feedback. Generalizing this teaching into cases where the last symbol does not encode a single code block, an acknowledgement for the predefined group may be based on a combination of error detection results for all but those code blocks which are at least partially encoded by the final OFDM symbol in the sequence. Using the notation from above, one sets M=N−1. The duration of one OFDM symbol may be of the order 50-100 µs in an available wireless communication system in view of transmit processing time, guard time and receiver processing time.

As regards future communication systems, such as 5G, the inventors have realized that it may be advantageous to base an acknowledgment for a predefined group of code blocks on a combination of error detection results for all but those code blocks which are at least partially encoded by the final modulation symbol. This is because the duration of a modulation symbol is likely to be set in view of the processing times and guard time, whereby scaling divergence is avoided.

In an embodiment illustrated in FIG. 9 as option 2, transmit processing starts before the last OFDM symbol is received. In this example, all but the last two code blocks are decoded. The associated ACK/NACK feedback transmission refers to the full transport block, but is based only on code blocks 1, 2 and 3 (P=2). In this option, only code blocks that are mapped to the first M=5 OFDM symbols are used for the ACK/NACK feedback.

It is a common trait of the embodiments illustrated as options 1 and 2 that transmission of the acknowledgement is initiated before the first communication node 10 has completed detection of errors in all code blocks in the predefined group. In particular, transmission of the acknowledgement is initiated before the at least one processor has completed error detection on at least one code block outside said subset.

In a variation to the embodiments illustrated as options 1 and 2, the first communication node 10 may base the acknowledgment on error detection results for code blocks that are nonconsecutive. One may furthermore base the acknowledgment on error detection results for code blocks that are non-initial in the transport block. Further still, one may as well base the acknowledgment on an irregular sequence, such as code blocks 1, 3 and 4 in the case N=5. Especially if the error detection is separate from the decoding processing, such exclusion of some non-endpoint code blocks may represent a reduction of the processing load. Since consecutive code blocks are strongly correlated, as the inventors have realized, excluding some non-endpoint code blocks only reduces the reliability negligibly.

Option 3 may be practiced in some existing technologies, such as LTE, and has been included for the sake of comparison. Here, transmit processing starts after all code blocks in the downlink transmission have been received and decoded. In this option the feedback related to the transport block is based on all code blocks. As FIG. 9 illustrates, transmission of ACK/NACK feedback may be completed earlier in options 1 and 2 compared to option 3. This brings significant benefits in terms of overhead as guard time may be shortened.

There may be a tradeoff associated with the embodiments described in this section. If too few code block are used for ACK/NACK feedback, then the risk of sending an ACK for a transport block that does in fact fail to decode (due to decoding of one of the last code blocks failing) increases. If too many code blocks are included, then guard time is unnecessarily long. Finding a suitable balance between these extreme conditions is believed to be within the abilities of one skilled in the art who has studied the present disclosure.

Figure 2:
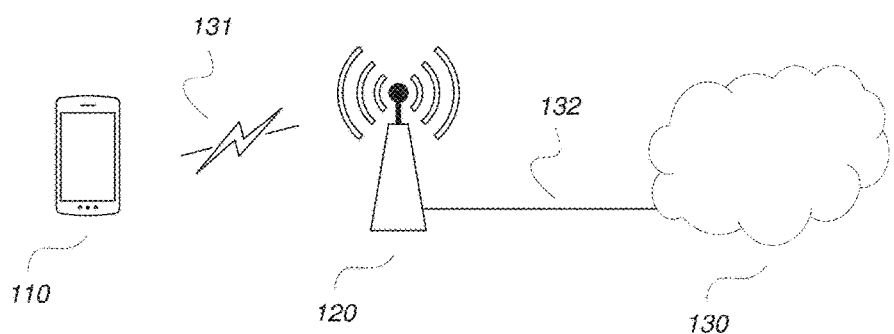
FIG. 2 illustrates a use case where an embodiment is implemented in an acknowledged connection between a wireless communication device (e.g., terminal, mobile station, user equipment) and a wireless access node (e.g., base station, eNodeB)

FIG. 2 shows a portion of a wireless network including a core network 130, a base station 120 and a UE 110. The base station 120 is connected over a wired (or fixed) connection 132 to the core network 230 and over a wireless downlink connection 131 to the UE 110. Both connections 131, 132 may be error-prone to some extent and may benefit from the teachings disclosed herein. In an embodiment, the UE 110 performs error detection on code blocks received over the downlink connection 131 and sends acknowledgments to the base station 120 on an uplink (not shown), wherein an acknowledgement for a predefined group of two or more code blocks is based on a combination of error detection results for a subset of the code blocks in the predefined group.

Figure 3:
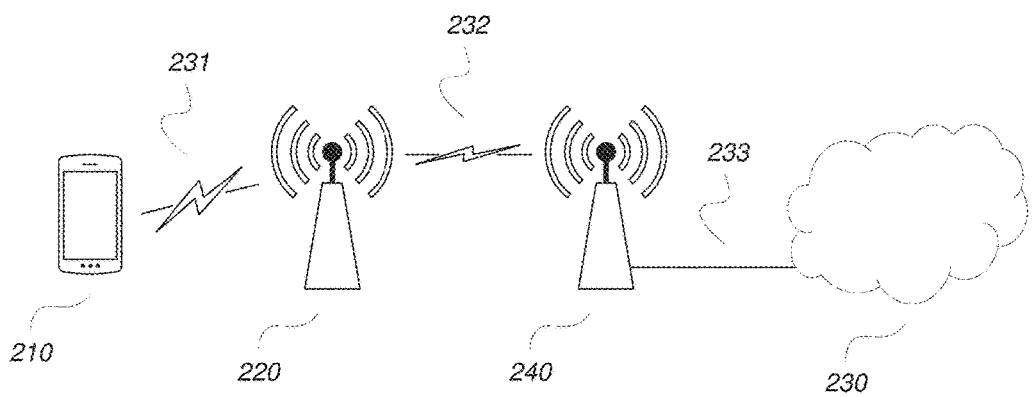
FIG. 3 illustrates a use case where an embodiment is implemented in a backhaul link between two wireless access nodes (e.g., base stations, eNodeBs)

FIG. 3 shows a portion of a wireless network including a core network 230, a first and second base station 240, 220 and a UE 210. The first base station 240 is connected over a wired (or fixed) connection 233 to the core network 230 and over a backhaul connection 232 to the second base station 220. The second base station 220 is in turn connected wirelessly to the UE 210, and thereby acts as a relay. All three connections 231, 232, 233 may be error-prone to some extent and may benefit from the teachings disclosed herein. In an embodiment, the second base station 220 performs error detection on code blocks received over the backhaul connection 232 and sends acknowledgments to the first base station 240, wherein an acknowledgement for a predefined group of two or more code blocks is based on a combination of error detection results for a subset of the code blocks in the predefined group.

The wireless networks discussed with reference to FIGS. 2 and 3 may be cellular networks, such as LTE (including LTE-Advanced) or a 5G wireless network. Each of the wireless connections 131, 231, 232 may be a time-division duplex (TDD) connection or a half-duplex frequency-division duplex (FDD) connection.

In the case of an LTE network, the predefined group of code blocks may be referred to as a transport block. In a 5G wireless communication system, the phrase "predefined group of block" may need to be reinterpreted in view of a possible change of the term "code block", as already discussed. Whether or not such reinterpretation is necessary in future communication technologies, the "predefined group" is to be understood as a unit which the receiving side is required (e.g., through agreement, standardization or the like) to acknowledge independently, and typically within a predefined time after transmission. Embodiments disclosed herein teach that an acknowledgement for such "predefined group" may be based on a combination of error detection results for a subset of the code blocks in the predefined group.

In the case of an LTE network, alternatively or additionally, the acknowledgment may be transmitted on a physical uplink control channel, PUCCH.

Figure 4:
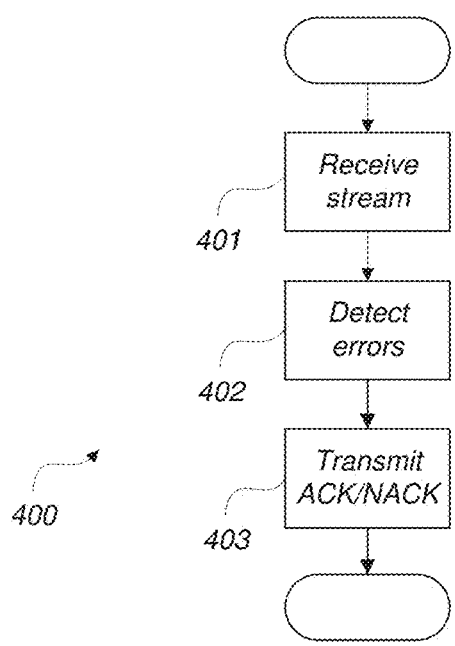
FIGS. 4 and 5 are flowcharts of a method in a (receiving) first communication node and a (transmitting) second communication node, respectively.

The operation of the first communication node 10 may be summarized by the method 400 illustrated in FIG. 4. The method 400 comprises a first step 401 of receiving a stream of code blocks from the second communication node 20, wherein each code block is associated with a check value enabling error detection and belongs to a predefined group of code blocks. The method 400 further comprises a second step 402 of detecting errors in received code blocks using respective associated check values, and a third step 403 of transmitting to the second communication node 20 an acknowledgement in respect of each of said predefined groups of code blocks, wherein a negative value of the acknowledgment signifies that an error was detected for at least one of the code blocks in the predefined group. In an embodiment, the acknowledgement for a predefined group of two or more code blocks is based on a combination of error detection results for a subset of the code blocks in the predefined group.

Resuming the description of FIG. 1, the second communication node 20 is adapted for acknowledged connection to the first communication node 10 and comprises a buffer 21 for temporarily storing code blocks to be transmitted to the first communication node 10. The second communication node 20 may receive such code blocks from a core network, in a similar way as illustrated in FIGS. 2 and 3. The second communication node 20 further comprises a transmitter 22 configured to transmit a stream of the code blocks to the first communication node 10, wherein the code blocks are grouped into predefined groups, and a receiver 23. The receiver 23 is configured at least to receive an acknowledgement in respect of one of the predefined groups of transmitted code blocks from the first communication node 10. The receiver 23 is furthermore configured to cause retransmission of said predefined group of transmitted code blocks in response to a negatively valued acknowledgment.

In one embodiment, the transmitter 22 is further configured to transmit an indication concerning timing or allowed delay of acknowledgement feedback. The indication may be transmitted at an initial stage of the acknowledged connection (unless a default value has been agreed on); further indications may be transmitted during operation to change, update or confirm the timing or allowed delay of acknowledgement feedback. Optionally, an indication is associated with limited duration of validity or an expiry time. The indication may be transmitted by unicast. Alternatively, in a communication network allowing broadcasting of information to all connected UEs, the indication concerning timing or allowed delay of acknowledgement feedback may be broadcast to nodes including the first communication node 10.

For instance, the indication may be indicative of a maximum allowed separation between complete transmission of a predefined group of code blocks and receipt of an acknowledgement in respect of the predefined group of code blocks.

Alternatively or additionally, the indication selects an acknowledgement feedback timing mode selected from two or more predefined acknowledgement feedback timing modes. In particular, two or more of the following acknowledgement feedback timing modes may be defined:
  a) the first communication node 10 is to transmit, of its own motion, an acknowledgement within a relatively shorter period $T_a$ after receipt of a predefined group of code blocks;
  b) the first communication node 10 is to transmit, of its own motion, an acknowledgement within a relatively longer period $T_b$ after receipt of a predefined group of code blocks;
  c) the first communication node 10 is to transmit an acknowledgment only upon explicit request by the second communication node 20.

Depending on implementation details of the first communication node 10, mode a) may include such short time period $T_a$ that the first communication node 10 may need to rely upon a predictive acknowledgement feedback according to one of the embodiment disclosed above, in particular one where an acknowledgement for a predefined group of two or more code blocks is based on a combination of error detection results for a subset of the code blocks in the predefined group. Meanwhile, mode b) may allow the first communication node 10 sufficient time $T_b$ to produce a single definite acknowledgment based on a combination of error detection results for all code blocks in a predefined group. If both modes a) and b) are such as to compel the first communication mode 10 to rely upon predictive acknowledgements, they may differ with respect to the size of the subset of the code blocks in the predefined group whose error detection results are combined for use as a basis for the acknowledgement in respect of the predefined group. In particular, they may differ with respect to the highest-numbered code block to be included.

For a detailed description of a system where mode c) is available, reference is made to U.S. Provisional Patent Application No. 62/221,345 and published subsequent non-provisional applications claiming the priority of that application.

More generally, the indication concerning timing or allowed delay of acknowledgement feedback may indicate one or more of the following:

i) size of the code blocks that the predefined group comprises. Short code blocks may require less processing time. Of particular importance is the size of the code blocks carried by the last modulation symbol;

ii) number of code blocks that the predefined group comprises;

iii) statically conveyed information on time allowed for acknowledgement feedback;

iv) dynamically conveyed information on time allowed for acknowledgement feedback;

v) an active acknowledgement feedback timing mode of a plurality of selectable acknowledgement feedback timing mode;

vi) timing advance settings in the first communication node 10, which may affect the link budget.

In some embodiments, the first communication node 10 may be operable to adapt its acknowledgement feedback in response to one or more of factors i)-vi). It is noted that the first communication node 10 may be operable to enter a mode of operation where it sends only definite acknowledgements, at least for a limited time period, in response to a change in the factors i)-vi). From the first communication node's 10 point of view, it is not essential to receive the information relating to factors i)-vi) precisely from the second communication node 20; indeed, the first communication node 10 may become aware of such factors through system information, cell information, measurements and the like.

Alternatively (the indication concerning timing or allowed delay of acknowledgement to feedback is absent) or additionally (the indication concerning timing or allowed delay of acknowledgement feedback is present), the second communication node 20 is configured to receive two acknowledgements for a same predefined group of code blocks, wherein the two acknowledgements are separated in time. From the first communication node's 10 point of view—but typically hidden from the second communication node 20—the first acknowledgment is predictive and the second acknowledgment is definite, e.g. based on a combination of error detection results for all code blocks in the predefined group or on equivalent information. Regardless of the (typically unknown) basis of an acknowledgement, the second communication node 20 may be configured to maintain a transmitted code block in the buffer until two positively valued acknowledgements have been received for a predefined group to which the code block belongs. After this point, the buffered transmitted code block may be deleted, overwritten or declared as overwritable, so as to liberate storage space in the buffer 21.

Specifically, the second communication node 20 may be configured to stop monitoring a second acknowledgement for a predefined group of code blocks one a negatively valued acknowledgment for the same predefined group code blocks. Similarly, the first communication node 10 may be configured to dispense with the definite acknowledgement for a predefined group of code blocks if it has transmitted a negatively valued acknowledgement for the same predefined group of code blocks; this is because the value of the second, definite acknowledgement will be derivable from the value of the first, predictive acknowledgment (negative if negative), whereby transmission of the definite acknowledgment would represent an unjustified contribution to system overhead.

Figure 5:
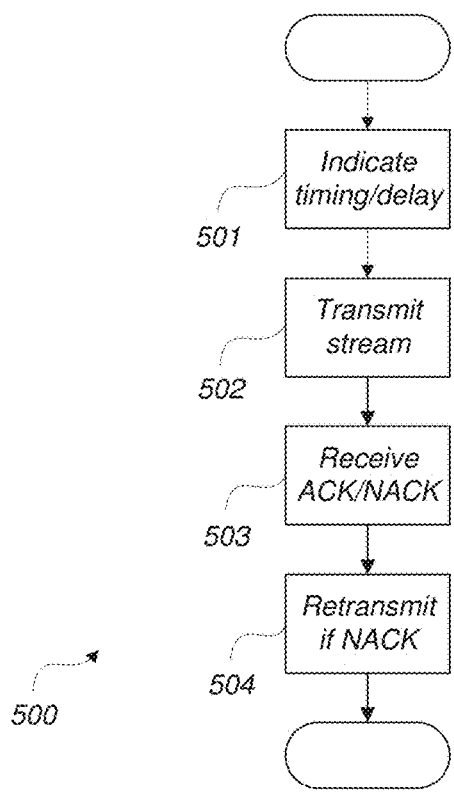
Figure 6:
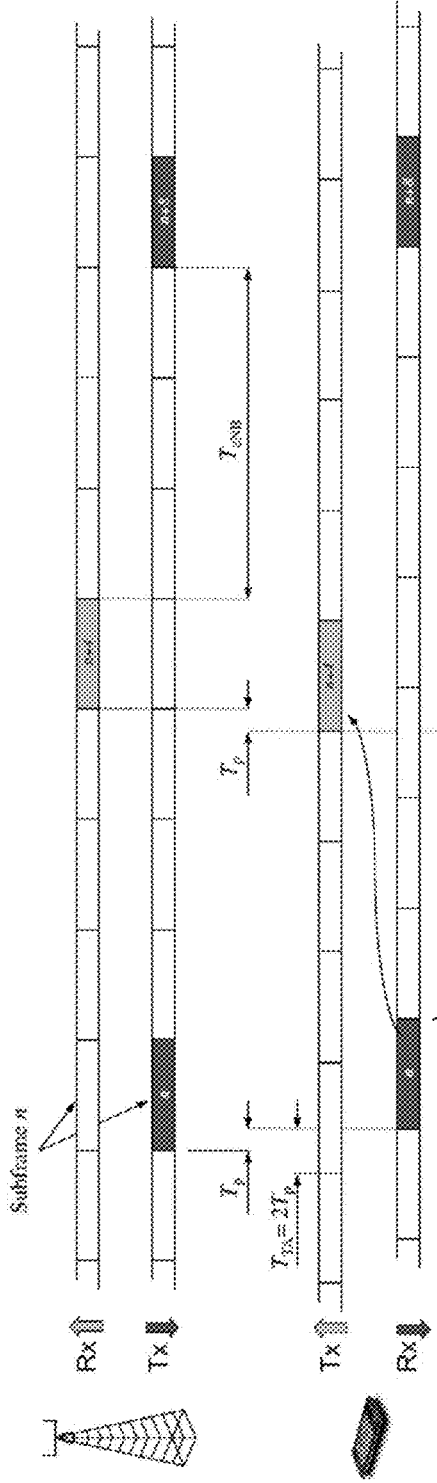
FIGS. 6 and 7 are schematic timing diagrams illustrating hybrid-ARQ in 3GPP LTE FDD and TDD, respectively.
Figure 7:
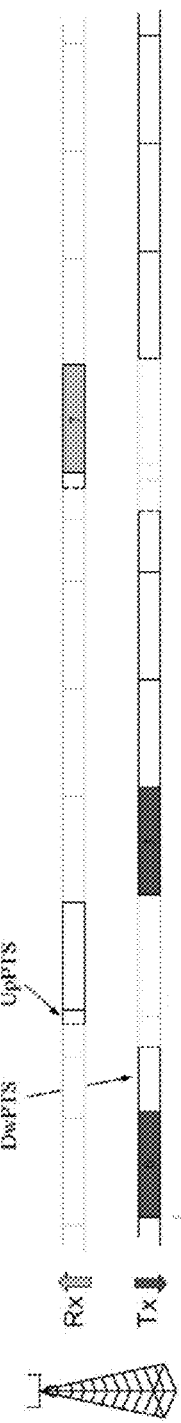
Figure 7:
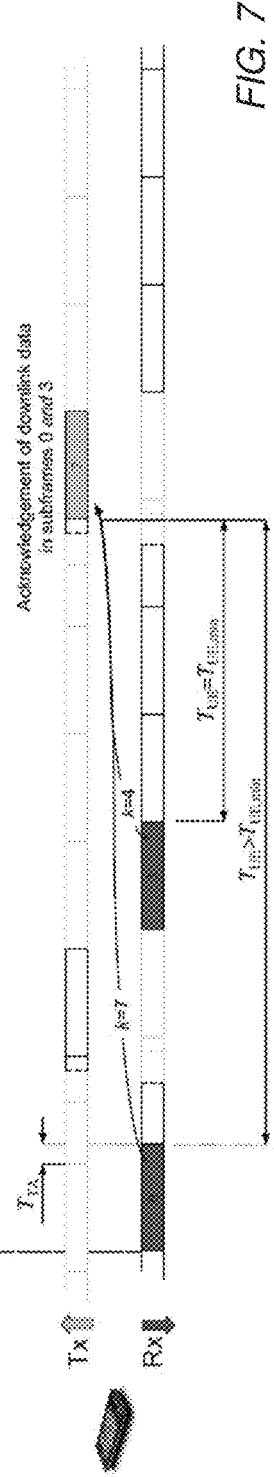
Figure 8:
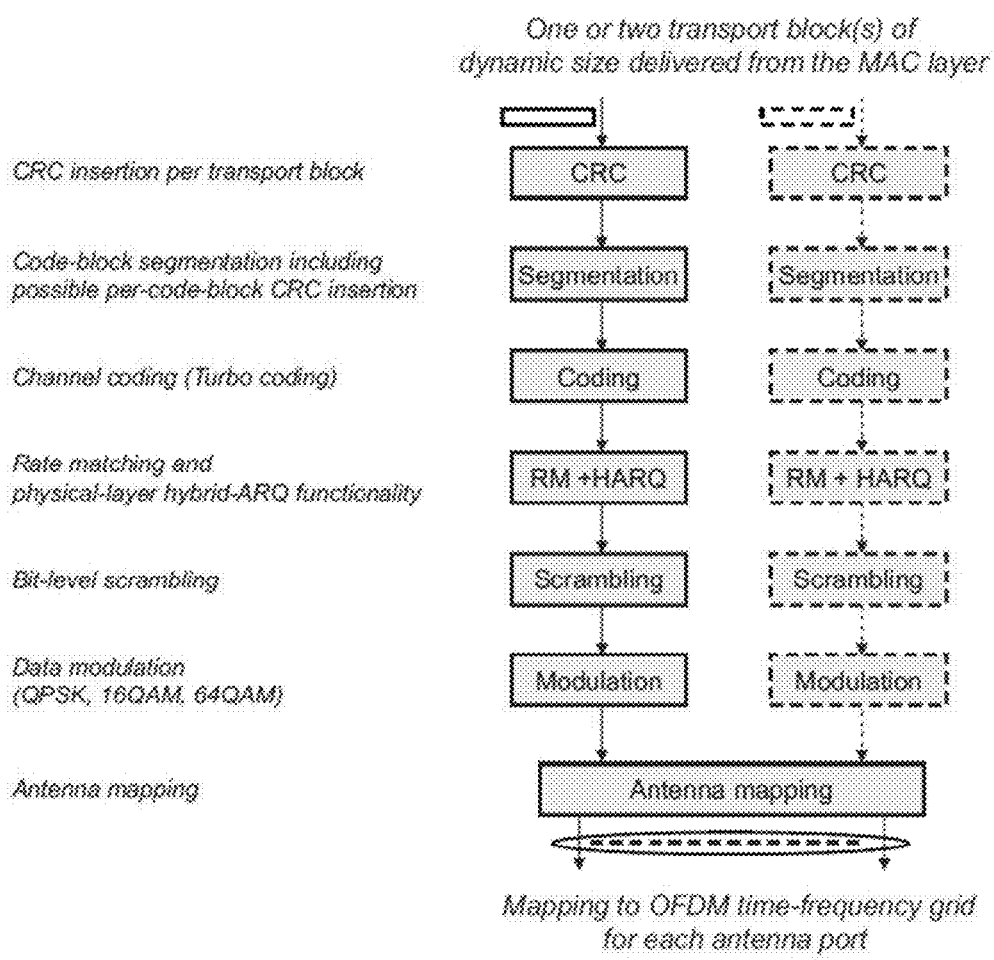
FIG. 8 is an overview block diagram illustrating transport-channel processing in 3GPP LTE.

The operation of the second communication node 20 may be summarized by the method 500 illustrated in FIG. 5. The method 500 comprises a step 502 of transmitting a stream of the code blocks to the first communication node 10, wherein the code blocks are grouped into predefined groups; a further step 503 of receiving from the first communication node 10 an acknowledgement in respect of one of the predefined groups of transmitted code blocks; and a further step 504 of retransmitting said predefined group of transmitted code blocks in response to a negatively valued acknowledgment. Still further, the method 500 comprises an initial step 501 of transmitting an indication concerning timing or allowed delay of acknowledgement feedback.

In an advantageous embodiment, the second communication node 20 is provided with a transmitter 22 configured to group the code blocks in such manner as to favor an early position of prioritized code blocks when it is known that the first communication node 10 is relying upon predictive acknowledgment. In particular, if the second communication node 20 indicates such short time period that the first communication node 10 will (likely) have to base its acknowledgements on a combination of error detection results for a subset of the code blocks in a predefined group, then subsequently the transmitter 22 may locate a code block that is deemed critical, has high priority, high importance and/or low latency budget early in relation to other code blocks in the group of code blocks. A prioritized code block which is located early, or at least in a non-final position within the group of code blocks, is certain to influence the receipt status of the group of code blocks to which it belongs, thereby triggering fast retransmission if necessary.

Embodiments herein also include a computer program comprising instructions which, when executed by at least one processor of a first 10 or second 20 communication node, cause the communication node to carry out the methods shown in FIGS. 4 and 5, respectively, or variations thereof. In one or more embodiments, a carrier containing the computer program is one of communication media (or transitory media, such as an electronic signal, optical signal, radio signal) or computer readable storage media (or non-transitory media). The term computer storage media includes both volatile and nonvolatile, removable and non-removable media implemented in any method or technology for storage of information; computer storage media includes but is not limited to RAM, ROM, EEPROM, flash memory or other memory technology, CD-ROM, digital versatile disks or other optical disk storage, magnetic cassettes, magnetic tape, magnetic disk storage or other magnetic storage devices, or any other medium which stores the desired information and is accessible by a computer. In at least one embodiment, a communication node or other apparatus is configured to perform the operations or functions disclosed herein, based at least in part on node processing circuitry executing computer program instructions stored in a non-transitory computer-readable medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A first communication node adapted for acknowledged connection to a second communication node, comprising:
   a receiver configured to receive an indication of timing of acknowledgment feedback and to receive a stream of code blocks from the second communication node, wherein each code block is associated with a check value enabling error detection and belongs to a predefined group of code blocks;
   at least one processor configured to generate an acknowledgment for the predefined group of code blocks according to the indicated timing by:
      determining a value P in dependence on the indicated timing;
      performing error detection for all but the $P \geq 1$ most recent ones of the code blocks in the predefined group of code bocks, yielding an error detection result for each code block on which the error detection is performed; and
      generating the acknowledgment for the predefined group of code blocks based on the error detection results;
   and
   a transmitter configured to transmit the acknowledgment to the second communication node.

2. The first communication node of claim 1, wherein the at least one processor is configured to adapt the number P further based on one or more of the following factors:
   size of the code blocks in the predefined group;
   number of code blocks in the predefined group;
   an active acknowledgment feedback timing mode of a plurality of selectable acknowledgment feedback timing modes; and
   timing advance settings in the first communication node.

3. The first communication node of claim 1, wherein the at least one processor is configured to transmit, via the transmitter, the acknowledgment as part of a feedback message that is initiated by the at least one processor earlier than the transmission of the acknowledgment or concurrently therewith.

4. The first communication node of claim 1, wherein the acknowledged connection to the second communication node further comprises a retransmission protocol.

5. The first communication node of claim 1, wherein the first communication node is a user equipment, the second communication node is a base station, and the acknowledged connection is a downlink.

6. The first communication node of claim 1, wherein the first and second communication nodes are base stations and the acknowledged connection is a wireless backhaul link or a relay link.

7. The first communication node of claim 1, wherein the at least one processor is further configured to transmit, via the transmitter, a definite acknowledgment based on a combination of error detection results for all the code blocks in the predefined group.

8. The first communication node of claim 1, wherein the predefined group comprises code blocks encoded by consecutive modulation symbols.

9. The first communication node of claim 1, wherein the check value associated with each code block in the predefined group of code blocks is one of: a parity bit, a hash value, a checksum value, a cyclic redundancy check value and a CRC value.

10. A method implemented in a first communication node for communicating with a second communication node over an acknowledged connection, comprising:
   receiving an indication of timing of acknowledgment feedback;
   receiving a stream of code blocks from the second communication node, wherein each code block is associated with a check value enabling error detection and belongs to a predefined group of code blocks;
   generating an acknowledgment for the predefined group of code blocks according to the indicated timing by:
      determining a value P in dependence on the indicated timing;
      performing error detection for all but the $P \geq 1$ most recent ones of the code blocks in the predefined group of code bocks, yielding an error detection result for each code block on which the error detection is performed; and
      generating the acknowledgment for the predefined group of code blocks based on the error detection results;
   and
   transmitting the acknowledgment to the second communication node.

11. A non-transitory computer-readable storage medium storing a computer program comprising instructions that, when executed on a processing circuit of a first communication node, cause the first communication node to:
   receive an indication of timing of acknowledgment feedback;
   receive a stream of code blocks from a second communication node, wherein each code block is associated with a check value enabling error detection and belongs to a predefined group of code blocks;
   generate an acknowledgment for the predefined group of code blocks according to the indicated timing by:
      determining a value P in dependence on the indicated timing;
      performing error detection for all but the $P \geq 1$ most recent ones of the code blocks in the predefined group of code bocks, yielding an error detection result for each code block on which the error detection is performed; and
      generating the acknowledgment for the predefined group of code blocks based on the error detection results;
   and
   transmit the acknowledgment to the second communication node.

* * * * *